(12) United States Patent
Oppitz

(10) Patent No.: US 6,707,186 B2
(45) Date of Patent: Mar. 16, 2004

(54) STATOR FOR AN ELECTRIC MACHINE (75) Inventor: Horst Oppitz, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/277,518

(22) Filed: Oct. 22, 2002

(65) Prior Publication Data

US 2003/0173854 A1 Sep. 18, 2003

(30) Foreign Application Priority Data

Oct. 22, 2001 (DE) .......................... 101 52 006

(51) Int. Cl.$^7$ .............................................. H02K 11/00
(52) U.S. Cl. ......................... 310/71; 310/189; 310/179
(58) Field of Search .......................... 310/71, 179, 189, 310/68 R; 29/596, 598

(56) References Cited

U.S. PATENT DOCUMENTS

| | | | | |
|---|---|---|---|---|
| 4,689,023 A | * | 8/1987 | Strong et al. ................ | 439/189 |
| 5,382,855 A | * | 1/1995 | Cousin ......................... | 310/71 |
| 5,825,109 A | * | 10/1998 | Jeske ........................... | 310/71 |
| 5,828,147 A | * | 10/1998 | Best et al. ..................... | 310/71 |
| 6,300,697 B1 | * | 10/2001 | Findeisen et al. .......... | 310/68 B |
| 6,369,473 B1 | | 4/2002 | Baumeister et al. .......... | 310/71 |
| 6,525,439 B2 | * | 2/2003 | Whelan et al. ........... | 310/68 R |
| 6,583,529 B2 | * | 6/2003 | Suzuki et al. ................ | 310/199 |
| 6,600,244 B2 | * | 7/2003 | Okazaki et al. ................ | 310/71 |

FOREIGN PATENT DOCUMENTS

| | | | | |
|---|---|---|---|---|
| DE | 198 50 818 | | 5/2000 | ............ H02K/3/28 |
| WO | WO 00/27014 | | 5/2000 | ............ H02K/3/52 |

* cited by examiner

Primary Examiner—Thanh Lam
(74) Attorney, Agent, or Firm—Cohen, Pontani, Lieberman & Pavane

(57) ABSTRACT

A plurality of stator coils having coil ends are arranged on an annular stator yoke. Concentrically arranged connection conductors which are electrically insulated relative to one another have laterally projecting terminals for connecting to the ends of the stator coils. Receiving chambers arranged about the front side of the stator yoke receive the terminals of the connection conductors and fix the connection conductors in position. The receiving chambers are allocated to the coil ends which form an electric clamping connection by pairs with the terminals of the connection conductors at the receiving chambers.

17 Claims, 5 Drawing Sheets

Section B-B

Fig. 3

Section A-A

Prior Art

STATOR FOR AN ELECTRIC MACHINE

BACKGROUND OF THE INVENTION

1. Field of the Invention

The invention is directed to a stator for an electric machine with a ring-shaped stator yoke at which a plurality of stator coils having coil ends are arranged, and with a wiring arrangement for the stator coils at a front side of the stator yoke, wherein the wiring arrangement has connection conductors which are electrically insulated relative to one another and are concentric to one another. The invention also relates to methods for producing a wiring arrangement of a stator.

2. Description of the Related Art

Known stators for electric machines have a stator yoke with a quantity of stator teeth which hold the electric winding, e.g., in the form of individual stator coils which are wound from an insulating wire. The ends of the coils are associated with individual strands and are wired together in a predetermined manner by shared connection conductors. In three-phase generators, the stator has three strands and, therefore, at least three connection conductors to which current is applied at a 120-degree phase offset. The connection conductors are fed to a switch box for connecting the electric machine to a source of electric power.

U.S. Pat. No. 6,369,473 discloses a stator for an electric machine in which the wiring arrangement has electrically insulated connection conductors allocated to each other in concentric manner (see FIG. 7 of the present patent application). The terminals for the ends of the stator coils are formed at the connection conductors as terminal extensions projecting from the latter. The electrical connection can be carried out by a joining technique such as welding, soldering and/or simple winding around the terminal extensions. The connection conductors are supported mutually and at the stator by means of insulating center strips arranged therebetween.

In one of the joined connections mentioned above, it is disadvantageous that the process heat introduced for connecting can result in damage to the insulation between the connection conductors and, further, to the insulation of the wound wires in the area of the coils. This can lead very quickly to unwanted short circuiting which influences the operation of the electric machine and can even lead its outage. Further, damage to the insulation arranged between the connection conductors cancels the fixed position of the connection conductors, which are then no longer arranged at the stator in such a way that reliable operation is ensured. Vibrations which occur during the operation of the electric machine or which act on the latter from the outside lead to mechanical alternating loads on the electrical connections of the machine which can loosen within a short period of time. Winding around the terminal extensions is a typical manual work step which impedes increased efficiency in the manufacture of such stators. Because of the relatively large number of coil ends, there is a considerable risk of faulty connections in the wiring of the coils of a stator due to incorrect allocation to the connection conductors. Even when great caution is exercised in this regard, 100 percent certainty can not be achieved in the manufacture of stators.

SUMMARY OF THE INVENTION

It is the object of the present invention to improve a stator constructed in the manner described above in such a way that particularly its wiring arrangement is designed more simply and can be produced, at the same time, by safe processes and in an automated manner. In a further aspect of the invention, methods are provided for producing a wiring arrangement of a stator.

According to a first solution, the invention is based on the arrangement of receiving chambers at the stator which are suitable for mechanically fixing the connection conductors in position and for carrying out the electrical connections of the coil ends to the respective connection conductors. In this way, the assembly steps comprising mechanical fixation of the connection conductors and electrical connection of the latter to the coil ends, which were originally two independent assembly steps, are combined in one individual step so that considerable time and cost are saved in the production of the stator.

According to a second solution, the connection conductors are not connected directly to the coil ends; rather separate plug-in contacts are arranged between the coil ends and the connection conductors. In this way, individual coils can be checked for proper functioning before they are arranged at the stator, and defective coils can be excluded from the continued assembly process. This prefabrication by means of inexpensive and easily fitted plug-in contacts makes it possible to economize on manufacturing costs and manufacturing time and accordingly reduces the return of defective stators at the same time.

In an advantageous construction, the receiving chambers have receiving means for the coil ends. The coil ends can accordingly also be brought into a predetermined position for contacting at the receiving chamber. This step aims at high reproducibility of the electrical connection points between the coil ends and the connection conductors.

Assembly is further simplified in that the receiving chambers are arranged on partial circles which substantially correspond to those of the connection conductors. In this case, for example, a circular connection conductor can simply be attached to an axial side of the stator, wherein the terminals of the connection conductor are simultaneously introduced into the corresponding receiving chambers and a plurality of desired electric clamping connections are also produced simultaneously.

In a particularly advantageous further development, the terminals of the connection conductors are constructed as piercing or cutting clamps. In this way, a cutting clamp connection, known in electrical connection technology, is realized with respect to the coil ends. A particularly noteworthy advantage is that the cutting clamp displaces the insulating sleeve of the coil ends when producing the connection, which obviates any additional steps for removing the insulating sleeve. Accordingly, unintended removal of the insulation sleeve at unwanted locations is excluded.

In repairs, the use of reusable cutting clamps enables fast and simple detachment of the electrical connection, e.g., to a defective coil or damaged connection conductor.

The cutting clamps are advantageously fixed in the receiving chambers by locking elements, for which purpose the terminals of the connection conductors and/or the receiving chambers include barbs or spring elements. Accordingly, when placed on an axial side of the stator, the connection conductors enter into a self-locking mechanical connection with the stator, so that it is not necessary to use additional connections such as screw connections or rivet connections.

It is likewise advantageous when the plug-in contacts and/or the receiving chambers comprise locking elements in the form of barbs or spring elements.

The number of receiving chambers associated with a coil end advantageously corresponds to the quantity of connection conductors. This ensures that the wiring remains changeable, that is, the coil ends can enter into an electrical connection with all connection conductors depending on the applied wiring plan.

It has proven advisable to form the receiving chambers at the bobbins. In this way, a simple and fixed allocation of positions of the coil ends to the receiving chambers is achieved.

Following the concentric arrangement of the common connection conductors, it is likewise useful to arrange the receiving chambers associated with a coil end at the stator radially with respect to one another.

The electrical connection points of the coil ends with the terminals of the connection conductors are preferably arranged within the interior of open chambers formed by the receiving chambers for protection against external influences.

Similarly, the electrical connection points of the coil ends with the plug-in contacts are advantageously arranged in the interior of the chambers.

In another advantageous variant of the invention, the connection conductors and the stator have reference features which determine the position of the connection conductors relative to the ends of the stator coils, and the terminals are so formed at the connection conductors and/or the receiving chambers are so formed at the stator that they correspond in pairs exclusively to predetermined positions at the stator after the allocation of position has been accomplished. In this way, a quantity of electrical connections is defined in a definite manner for a predetermined wiring plan and errors are reliably excluded.

In an analogous manner, it is also advantageous according to the second solution when the connection conductors and the stator have reference features which determine the position of the connection conductors relative to the ends of the stator coils, and the mating elements are formed at the connection conductors and/or the plug-in contacts elements are formed at the stator in such a way that they correspond in pairs exclusively to predetermined positions at the stator after mutual allocation of position has been accomplished.

In an advantageous construction, the plug-in contacts also have cutting clamps for forming a cutting clamp connection with the coil ends.

The plug-in contacts are constructed, for example, as known flat contacts or spring contacts.

The connection of the connection conductors to the plug-in contacts is substantially simplified during assembly when the plug-in contacts and the receiving means of the connection conductors have play in circumferential direction with respect to the arrangement at the stator.

According to a second feature of the invention, a method for producing a wiring arrangement of a stator has the following essential steps:

arranging the stator coils at the stator yoke;

aligning the coil ends to the receiving chambers;

allocating the position of the connection conductors to the stator;

inserting the terminals of the connection conductors into the receiving chambers, wherein the coil ends are electrically clamped to the terminals of the connection conductors.

In another method for producing a wiring arrangement of a stator, the following steps are carried out:

aligning coil ends to the receiving chambers;

inserting of the plug-in contacts into the receiving chambers, wherein the plug-in contacts are electrically clamped with the coil ends;

arranging the stator coils at the stator yoke;

allocating the position of the connection conductors to the stator;

connecting the mating elements of the connection conductors to the plug-in contacts, wherein the latter enter into an electrical connection with the connection conductors and, in so doing, fix the connection conductors in their position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figures 1, 2:
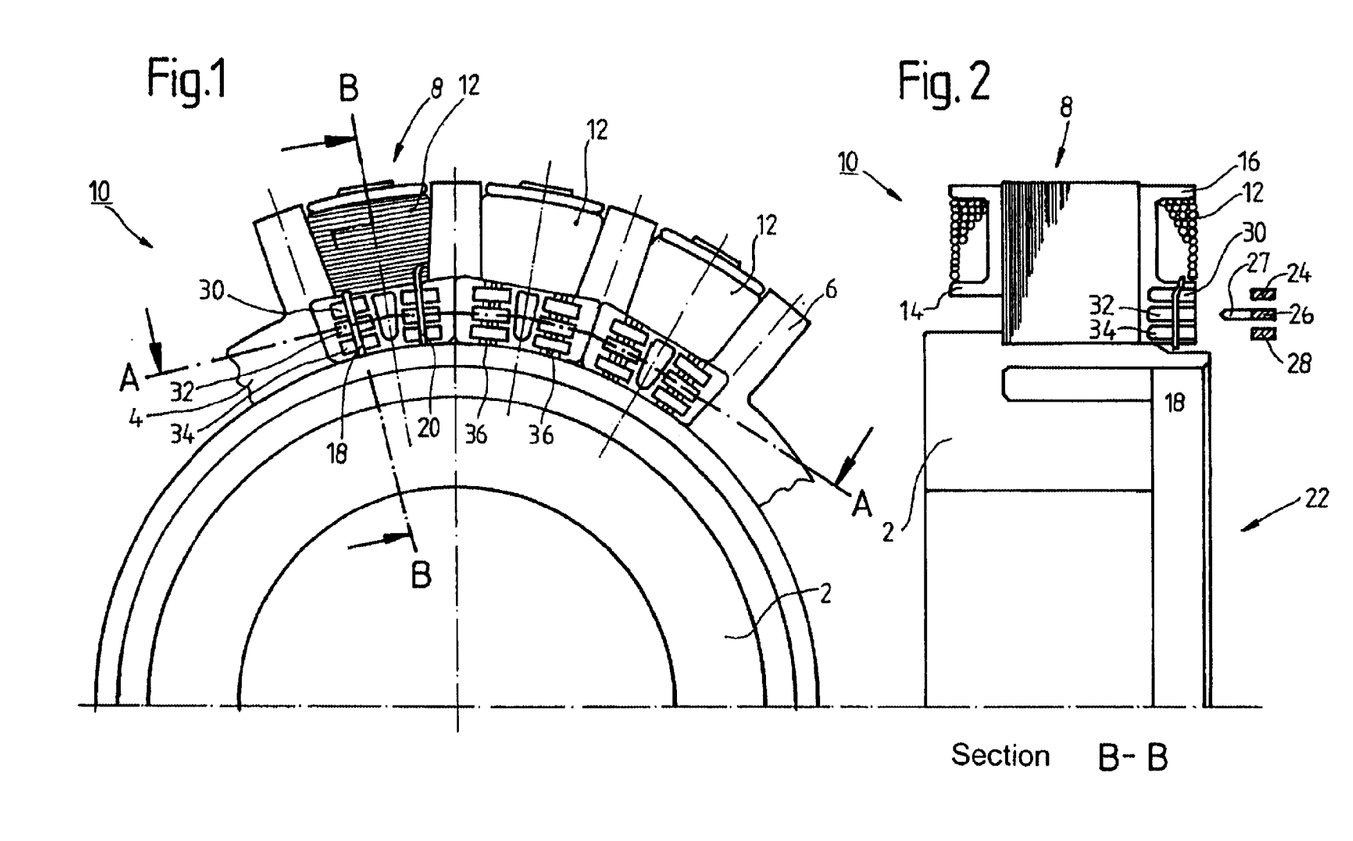
FIG. 1 shows a schematic view of a stator with coils arranged on its teeth.
FIG. 2 shows a schematic longitudinal sectional view of the stator shown in FIG. 1.

FIG. 1 shows a stator 10 mounted on a cooled hub 2 for an electric machine, not shown in more detail, with an annular stator yoke 4 comprising electric sheet metal laminations. The specific construction of the electric machine is not relevant to the following description. For example, the electric machine can be a permanently excited synchronous machine, an induction motor, a reluctance generator in internal rotor construction, external rotor construction or pancake construction, or some other kind of electric machine. The stator yoke 4 has, in circumferential direction, a quantity of teeth 6 which are directed radially outward, every second tooth 6 being fitted with an individual coil 8. The coils 8 comprise a winding 12 of an individual conductor or multiwire conductor whose individual conductors can be twisted together. In FIG. 1, the individual coils 8 were wound separately in a previous manufacturing step by means of bobbins 16 comprising an insulating material and were subsequently pulled over the teeth 6 of the stator yoke 4 and secured to prevent slipping. Every coil 8 has two coil ends 18, 20 which are guided out of the coils 8 at a common front side 22 of the stator 10 and are ready to be wired together. The coils 8 are generally allocated to individual strands and, as will be explained later on, are wired together by shared connection conductors 24, 26, 28 in a predetermined manner. In an arrangement which is not illustrated in the drawings, the connection conductors 24, 26, 28 have terminal lugs for connecting the electric machine to an electric power supply and a control device. However, these are not the subject matter of the present invention.

The connection conductors 24, 26, 28 comprise closed conductors which are bent in the shape of a ring and which are only indicated in FIG. 2 and are not shown in FIG. 1 for the sake of clarity.

Figure 7:
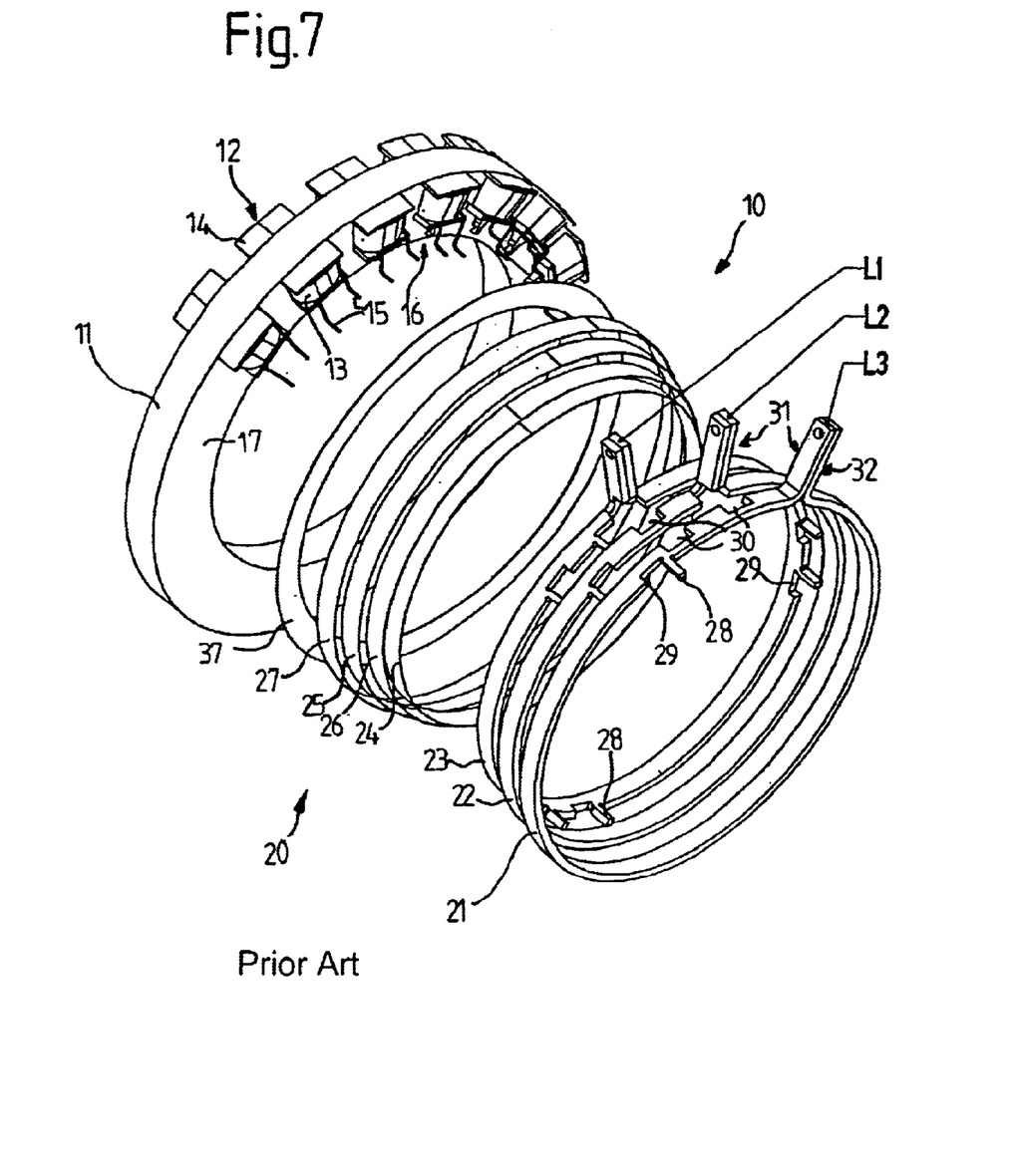
FIG. 7 shows a wiring arrangement known from the prior art.

The basic arrangement of the ring-shaped connection conductors 24, 26, 28 corresponds to the solution known from the prior art which is shown in FIG. 7 with the exception of the arrangement, according to the invention, of the terminals projecting from the connection conductors 24, 26, 28 for producing an electrical connection to the individual coils 8 as will be described in the following. In the present case, the connection conductors 24, 26, 28 are concentric to one another at the stator 10 so as to save space.

The following description relates to the connection of the coil ends 18, 20 to the connection conductors 24, 26, 28 and is initially directed to the arrangement of the elements which are fixedly arranged on the stator 10 and then to the particulars of the connection conductors 24, 26, 28 and the connection itself.

FIG. 2 shows a section B—B through an individual coil 8 with a bobbin 16 which functions as the same time as an insulating body which has, radially below its winding area, an elongation of the base leg at which are formed receiving chambers 30, 32, 34 which have openings provided for receiving the terminals projecting laterally from the connection conductors 24, 26, 28 and which can hold the connection conductors securely in position at the stator 10. In the sectional view in FIG. 2, only the middle connection conductor 26 has a terminal 27 visible. The other connection conductors 24 and 28 also have lateral terminals, but this is not shown at the position illustrated in the drawing. The terminals 25, 27, 29 are constructed at the connection conductors 24, 26, 28 in circumferential direction only at the positions at which an electrical connection to a coil end is provided in the arrangement at the stator. In the present example, the receiving chambers 30, 32, 34 are formed at a bobbin 16 integral to that latter. Alternatively, the receiving chambers 30, 32, 34 can also form separate elements and are arranged separately at the stator 10. Further, it can be seen from FIGS. 1 and 2 that the receiving chambers 30, 32, 34 are arranged on partial circles substantially corresponding to those of the connection conductors 24, 26, 28. Further, three receiving chambers 30, 32, 34 are allocated to every coil end 18, 20. Accordingly, the quantity of receiving chambers allocated to a coil end corresponds to the quantity of connection conductors. The receiving chambers 30, 32, 34 associated with a coil end 18, 20 are arranged radial to one another at the stator.

In addition to holding the connection conductors 24, 26, 28, the receiving chambers 30, 32, 34 have an additional function with respect to the production of the electrical connection between the coil ends 18, 20 and the connection conductors 24, 26, 28.

Figure 3:
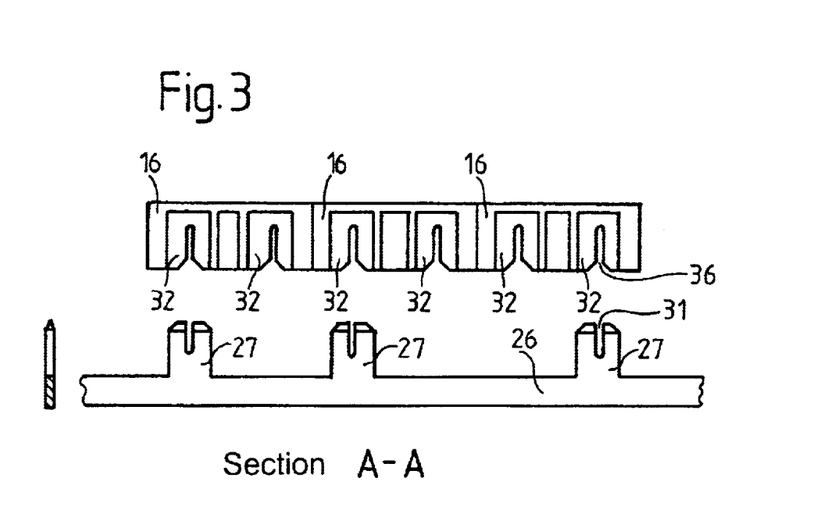
FIG. 3 shows a schematic sectional view of a winding body or bobbin in the area of the receiving chambers.

For this purpose, the coil ends 18 and 20 in FIG. 1 are initially guided radially inward, but axially adjacent with respect to the bobbin 16, through all openings of the associated chambers 30, 32, 34. The receiving chambers are accordingly allocated to the coil ends which can form an electrical clamping connection with the terminals of the connection conductors at the receiving chambers in pairs. In FIG. 1, it is possible in principle to connect the coil end 18 in each of the chambers 30, 32, 34 to a correspondingly designed connection conductor. The connection points of the coil ends 18, 20 to the terminals of the connection conductors 24, 26, 28 are provided in the interior of the chambers 30, 32, 34. Therefore, as is also shown in FIG. 3, radially extending slots 36 which proceed from a funnel-shaped area and become deeper in axial direction are provided at the front sides of the chambers 30, 32, 34 and form guide means for the coil ends 18, 20. In the view according to FIG. 2, the coil end 18 is shown in a position which results when the terminal 27 is inserted into the chamber 32.

FIG. 3 shows a section A—A through a plurality of bobbins 16 formed with chambers 32 and a ring-shaped connection conductor 26 with laterally projecting terminals 27 which are constructed as cutting clamps for producing a cutting clamp connection. The terminals 27 have insulation displacing slots 31 which are provided for receiving coil ends 18, 20 and which are constructed to displace the insulating sleeve of the coil wire and deform the solid conductor or the individual wires of a stranded wire conductor and accordingly produce a gastight electrical connection.

Figure 4:
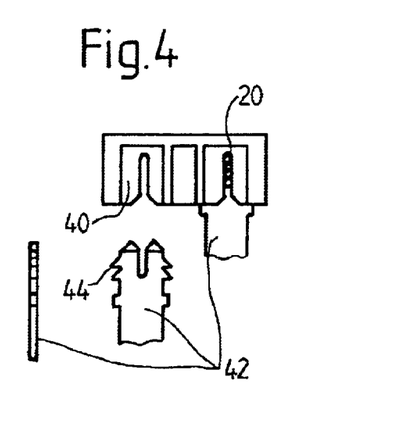
FIG. 4 shows a schematic sectional view of a chamber with flat contacts.

FIG. 4 shows a sectional view through a chamber 40 with a cutting clamp 42 which is shaped as a flat contact and which has barbs 44 at its outer contour for locking in the chamber 40 in order to be fixed in position. The cutting clamp terminal 42 shown on the right-hand side has already been inserted into the chamber 40 and has formed a cutting clamp connection with a coil end 20 which comprises three individual conductors in the present example.

Figure 5:
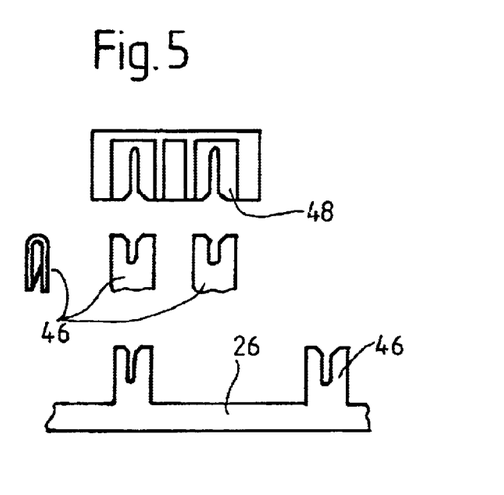
FIG. 5 shows a schematic sectional view of a chamber with springing contacts.

FIG. 5 shows another construction of a cutting clamp terminal 46 which has a spring contact whose arms are supported against the walls of the chamber 48. Alternatively, the locking elements can also be formed at the receiving chambers rather than at the cutting clamps. The cutting clamps can advantageously be constructed as reusable cutting clamps and accordingly make possible repeated wiring.

Figure 6A:
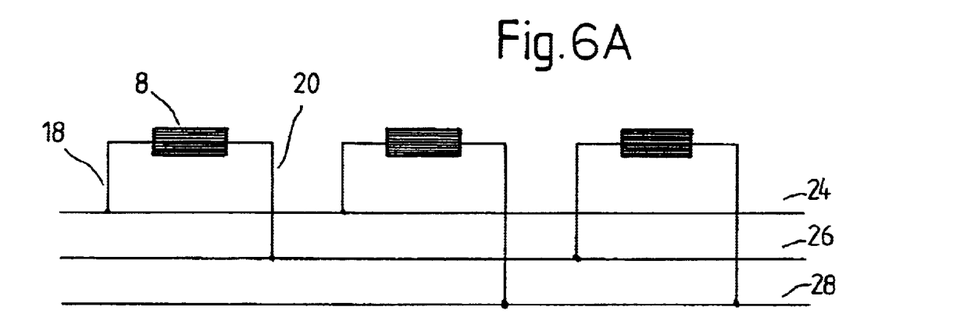
FIG. 6A is a schematic wiring arrangement.
Figure 6B:
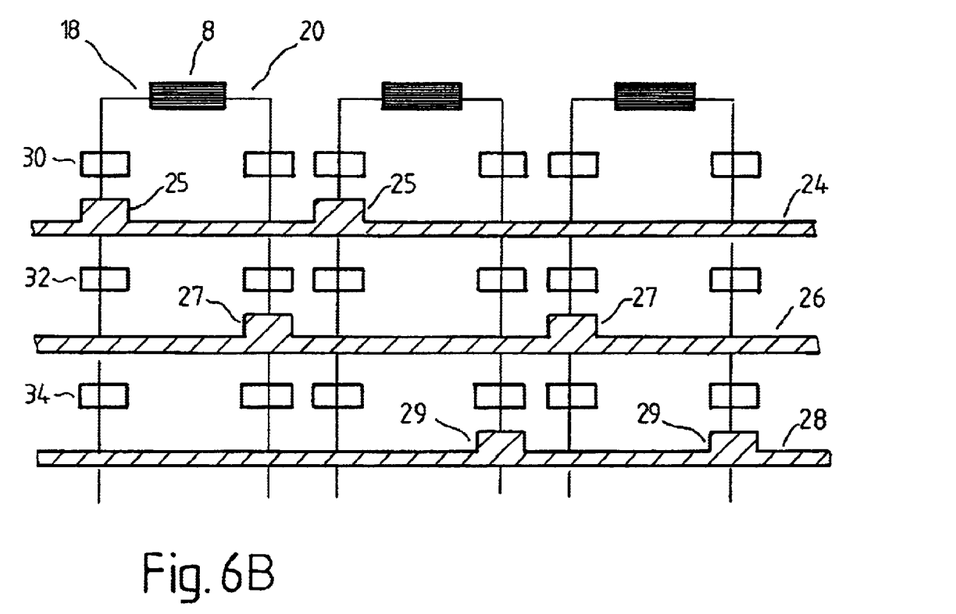
FIG. 6B shows the implementation of the wiring diagram.

In order to fix the connection conductors and their terminals in position, the connection conductors and the stator have at least one reference feature, not shown in the drawing, which determines the position of the connection conductors relative to the ends of the stator coils, and the terminals are so constructed at the connection conductors and/or the receiving chambers are so constructed at the stator that they correspond in pairs exclusively to predetermined positions at the stator after the position allocation has been accomplished. Impressions, color markings or design features, for example, are suitable as allocation features. The wiring of the two coil ends to the plurality of connection conductors is accordingly predetermined by the construction of the terminals at the connection conductors and/or by the position of the receiving chambers relative to the connection conductors. Wiring errors can be reliably excluded in this way. An electrical connection can accordingly be carried out only at positions where, in addition to a coil end, a pair formed by a receiving chamber and a terminal of a connection conductor occurs. FIG. 6A shows a wiring diagram for the wiring of coil ends 18, 20 of three coils 8 to three connection conductors 24, 26, 28. The corresponding arrangement of the connection conductors 24, 26, 28 with lateral terminals 25, 27, 29 and their positioning in relation to the coil ends 18, 20 are shown schematically in FIG. 6B.

When producing a stator 10 according to the construction shown in FIGS. 1 to 6, the stator coils 8 are initially arranged at the stator yoke 4 and, in a further step, are aligned with the receiving chambers 30, 32, 34 in which they are placed so as to be directed radially inward via the openings in the chambers in the area of the slots which open out in a funnel-shaped manner. However, the coil ends 18, 20 can also be cut to length immediately after winding and easily pressed into the slots in the chambers. For this purpose, the coil can be located on a winding machine. The annular connection conductors 24, 26, 28 are then positioned relative to one another by means of the orientation features arranged at the stator 10 and connection conductors 24, 26, 28. As a result, the terminals of the connection conductors 24, 26, 28 and the receiving chambers 30, 32, 34 are located axially across from one another only at the desired positions. In a final step, the terminals of the connection conductors 24, 26, 28 are inserted into the receiving chambers 30, 32, 34 by lateral insertion, wherein the coil ends 18, 20 are electrically clamped with the terminals 27 of the connection conductors. In so doing, the slot of the terminal 27 displaces the insulating sleeve of the coil ends 18, 20 and deform the solid conductor or individual wires of a twisted wire conductor and accordingly produces a gastight connection. At the same time, the connection conductors 24, 26, 28 are mechanically locked at the stator 10. The connection conductors 24, 26, 28 which are now arranged concentrically are separated by intervals of air and are prevented from contacting each other. If needed, an insulating material, e.g., an insulating center strip, can also be introduced into these intermediate spaces in addition. In many cases, electric impregnating resin which covers or fills the free surfaces and accessible intermediate spaces when the stator is impregnated is also sufficient. This safely prevents short circuiting between these conductors.

Figure 8:
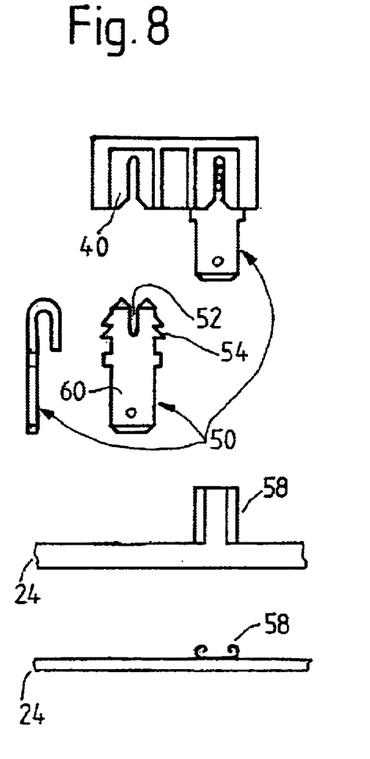
FIG. 8 shows a wiring arrangement with plug-in contacts.
Figure 9:
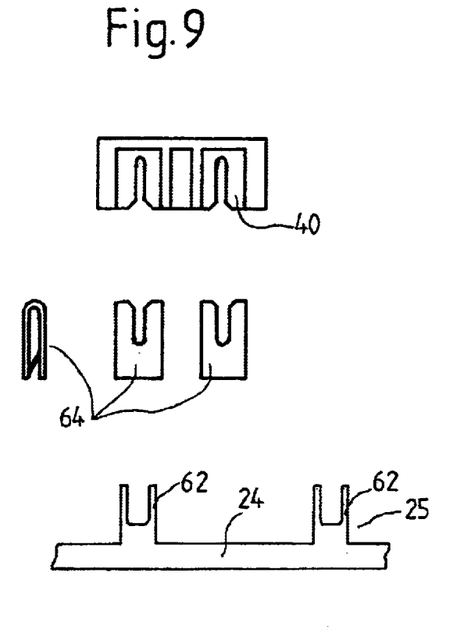
FIG. 9 shows another construction of a wiring arrangement with plug-in contacts.

FIGS. 8 and 9 show embodiment examples according to the second solution, wherein the connection conductors are not directly connected to the coil ends but, rather, separate plug-in elements are arranged between the coil ends and the connection conductors. The previous comments with regard to the construction of the stator also apply in the present case, and reference is had to the preceding description in order to avoid repetition. The stator and the connection conductors can also have markings for mutual allocation of position.

FIG. 8 shows a section A—A through a plurality of receiving chambers 40 of a bobbin 16 arranged at the stator 10 in accordance with FIGS. 1 and 2. Plug-in contacts 50, e.g., flat plugs, as shown, which have a slot 52 to produce an electric cutting clamp connection with the coil ends 18, 20 are inserted into the receiving chambers 40 already following the fabrication of the winding 12. The electrical connection points of the coil ends 18, 20 with plug-in contacts 50 are arranged in the interior of the chambers 40. The plug-in contacts 50 are bent in a U-shaped manner on the side received in the chambers 40, so that the two legs can be supported against the walls of the chambers 40. In addition, barbs 54 are formed at the outer contour of the plug-in contact 50 for the purpose of mechanical fixation. Alternatively, the receiving chambers 40 can have by themselves or in addition, locking elements in the form of barbs or spring elements.

Mating elements 58 are constructed at the connection conductors 24, 26, 28, only one of which is shown in the drawing, in the form of terminal lugs with partially bent outer areas which receive tongues 60 of the plug-in contacts 50 while forming an electrical connection and, in so doing, fixing the connection conductors 24, 26, 28 in their position at the stator 10. Alternatively, the tongues 60 of the plug-in contacts 50 and the terminal lugs 58 of the connection conductors 24, 26, 28 can also be angled and, in addition, bent in different desired directions.

A particularly advantageous variant is the chamber 40 of a bobbin 16 shown in FIG. 9 which can be fitted with spring contacts 64 based on the cutting clamp technique. For the sake of simplicity, only one annular connection conductor 24 is shown in this example, also. The connection conductor 24 is outfitted with laterally projecting mating elements 25 in the form of flat tongues 62 which are arranged at distances predetermined in the desired circuit. The flat tongues 62 are somewhat narrower than the plug-in contacts 64, which are constructed in this case as spring contacts, and in the assembled state have play in circumferential direction with respect to the stator 10. As a result of this construction, the wiring arrangement is less sensitive to tolerances and is best suited for automation. The coils 8 are secured in their position against radial movement by the wiring arrangement with its total of three connection conductors 24, 26, 28 whose lateral terminals 25, 27, 29 are anchored in the receiving chambers 40 of the coils by the plug-in contacts 64.

With reference to the stator shown in FIGS. 1 and 2 and the contacts shown in FIGS. 8 and 9, the wiring of the stator 10 can be constructed in the following manner. First, the coils 8 are wound on a winding machine provided for this purpose using two bobbins 14, 16, at least one of which has corresponding receiving chambers 30, 32, 34 for the wiring arrangement. After the winding process, the coil ends 18, 20 are aligned with the receiving chambers 30, 32, 34 and lightly pressed into the wire guide slots 36. In another step, the plug-in contacts 50, 64 are inserted into the receiving chambers 30, 32, 34 and the plug-in contacts 50, 64 are electrically clamped with the coil ends 18, 20. The plug-in contacts 50, 64 can be inserted into all receiving chambers 30, 32, 34 associated with a coil end 18, 20, so that the subsequent wiring of the coils is fully variable, or the plug-in contacts 30, 32, 34 are only inserted into the provided receiving chambers 30, 32, 34 in wiring plans that are already determined. In the latter case, a particularly reliable wiring arrangement results when using connection conductors 24, 26, 26 with a predetermined arrangement of the lateral terminals 25, 27, 29. The alignment of the coil ends 18, 20 and the contact with the plug-in contacts 50, 64 can be carried out in an automated manner at the winding machine or also manually or automatically by another mechanism after the coil 8 has already been removed from the winding machine. It is useful to check the functioning of the coils 8 contacted by the plug-in contacts 50, 64 prior to further assembly and to sort out defective coils. In the next step, the coils 8 are arranged at the stator yoke 4 and, as the case may be, fixed by suitable means, e.g., catch elements. When the coils 8 are fitted to the ends 18, 20 with only two plug-in contacts 50, 64 for wiring with two of three connection conductors 24, 26, 28, care must be taken already at this stage that the coils 8 are connected at the stator 10 in the correct arrangement. In another step, the position of the connection conductors 24, 26, 28 relative to the stator 10 is determined and the mating elements 58, 62 of the connection conductors 24, 26, 28 are subsequently connected with the plug-in contacts 50, 64, wherein the latter enter into an electrical connection with the connection conductors 24, 26, 28 and fix the connection conductors 24, 26, 28 in position.

In order to facilitate the allocation of the connection conductors 24, 26, 28 to the stator 10, the connection conductors 24, 26, 28 and the stator 10 have reference features, not shown, analogous to the example mentioned above with reference to FIGS. 1 to 6, which determine the position of the connection conductors 24, 26, 28 relative to the ends 18, 20 of the stator coils 8. The mating elements 58, 62 are so constructed at the connection conductors 24, 26, 28 and/or the plug-in contacts 50, 64 are so constructed at the stator 10 that they correspond by pairs exclusively to predetermined positions at the stator 10 after the mutual allocation of positions has been accomplished. After producing the wiring arrangement of the stator 10, the stator 10 is impregnated with electrical impregnating resin in a known manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A stator for an electric machine, said stator comprising:
   an annular stator yoke having an axis and an axial front side,
   a plurality of stator coils arranged about said yoke, each said coil having a pair of coil ends,
   a plurality of connection conductors arranged concentrically about said axis and electrically insulated from each other, each said connection conductor having laterally extending terminals for connecting to respective said coil ends, each said coil being connected across two said connection conductors by electrical clamping connection of said coil ends to respective terminals of two respective said connection conductors, and
   a plurality of receiving chambers arranged about said front side of said stator yoke and allocated to said coil ends, said receiving chambers receiving respective said terminals and fixing the connection conductors in position.

2. A stator as in claim 1 wherein each said terminal comprises a plug-in contact which forms said electrical clamping connection with a coil end and a mating element fixed to one of said connection conductors, said plug-in contacts mating with respective said mating elements.

3. A stator as in claim 1 wherein said receiving chambers comprise means for positioning said coil ends.

4. A stator as in claim 1 wherein said receiving chambers are arranged on circles, said connection conductors being arranged on circles having like radii as said circles on which said receiving chambers are arranged.

5. A stator as in claim 1 wherein said terminals comprise cutting clamps.

6. A stator as in claim 5 wherein said cutting clamps displace insulation and deform solid conductor of said coil ends.

7. A stator as in claim 1 wherein said terminals comprise locking elements, said locking elements comprising one of barbs and spring elements.

8. A stator as in claim 1 wherein said receiving chambers comprise locking elements, said locking elements comprising one of barbs and spring elements.

9. A stator as in claim 1 wherein the number of receiving chambers allocated to each coil end corresponds to the number of connection conductors.

10. A stator as in claim 1 further comprising bobbins on which said stator coils are wound, said receiving chambers being formed in said bobbins.

11. A stator as in claim 1 wherein the receiving chambers allocated to each coil end are arranged radially with respect to each other.

12. A stator as in claim 1 wherein said coil ends have connection points for connecting to said terminals, said connection points being arranged in respective said chambers.

13. A stator as in claim 1 wherein said terminals and said receiving chambers have reference features which determine the position of the connection conductors with respect to the coil ends, each said terminal and each said receiving chamber forming a pair which is allocated to an exclusive predetermined position on said stator yoke.

14. A stator as in claim 2 wherein each said plug-in contact is formed as one of a flat contact and a spring contact.

15. A stator as in claim 2 wherein said plug-in contacts and said mating elements are designed to have circumferential play with respect to each other when mated.

16. A method for producing a stator of the type comprising an annular stator yoke having an axis and an axial front side, a plurality of stator coils arranged about said yoke, each said coil having a pair of coil ends, a plurality of connection conductors arranged concentrically about said axis and electrically insulated from each other, each said connection conductor having laterally extending terminals for connecting to respective said coil ends, each said coil being connected across two said connection conductors by electrical clamping connection of said coil ends to respective terminals of two respective said connection conductors, and a plurality of receiving chambers arranged about said front side of said stator yoke and allocated to said coil ends, said receiving chambers receiving respective said terminals and fixing the connection conductors in position, said method comprising
   arranging the stator coils at the stator yoke,
   aligning the coil ends with the receiving chambers,
   positioning the connection conductors in a predetermined position with respect to the stator yoke, and
   inserting the terminals into the receiving chambers so that the coil ends are electrically clamped in the terminals.

17. A method for producing a stator of the type comprising an annular stator yoke having an axis and an axial front side, a plurality of stator coils arranged about said yoke, each said coil having a pair of coil ends, a plurality of connection conductors arranged concentrically about said axis and electrically insulated from each other, each said connection conductor having laterally extending terminals for connecting to respective said coil ends, each said terminal comprising a plug-in contact which forms said electrical clamping connection with a coil end and a mating element fixed to one of said connection conductors, each said coil being connected across two said connection conductors by electrical clamping connection of said coil ends to respective terminals of two respective said connection conductors, and a plurality of receiving chambers arranged about said front side of said stator yoke and allocated to said coil ends, said receiving chambers receiving respective said terminals and fixing the connection conductors in position, said method comprising     arranging the stator coils at the stator yoke,     aligning the coil ends with the receiving chambers,     inserting the plug-in contacts into the receiving chambers so that the coil ends are electrically clamped in the plug-in contacts,     positioning the connection conductors in a predetermined position with respect to the stator yoke, and     mating the mating elements with respective said plug-in contacts to fix the predetermined conductors in position.

\* \* \* \* \*